Nov. 10, 1964   B. L. BRUCKEN ETAL   3,156,648
FILTER CARTRIDGE FOR A DRY CLEANING SYSTEM
Filed March 16, 1962   4 Sheets-Sheet 1

INVENTORS
Byron L. Brucken
BY Victor A. Williamitis

Frederick M. Ritchie
Their Attorney

United States Patent Office 3,156,648
Patented Nov. 10, 1964

3,156,648
FILTER CARTRIDGE FOR A DRY CLEANING SYSTEM
Byron L. Brucken and Victor A. Williamitis, Dayton, Ohio, assignors to General Motors Corporation, Detroit, Mich., a corporation of Delaware
Filed Mar. 16, 1962, Ser. No. 180,078
9 Claims. (Cl. 210—209)

This invention relates to a domestic appliance and more particularly to an improved filter cartridge for a self-service dry cleaning system.

In a replaceable filter cartridge system, it is desirable to provide a cartridge which is inexpensive and easy to handle. Further it is desirable to have a cartridge which positively prevents the migration of granular materials from the filter chamber to the dry cleaning area and which completely conditions the dry cleaning solvent.

Accordingly, it is an object of this invention to provide an improved disposable filter cartridge which contains a plurality of filtering and solvent conditioning agents in fixed relationship.

Another object of this invention is the provision of a cast filter cartridge having the necessary physical properties to be self-supporting.

Another object of this invention is the provision of a cast matrix for a replaceable cartridge, said matrix including a detergent as the frothing agent for controlling the porosity of the cartridge.

A more particular object of this invention is the provision of a self-supporting, precast filter cartridge which includes ingredients for treating a dry cleaning solvent to provide physical filtration, acid neutralization, decolorization and moisture control as well as ingredients such as detergents and antistats to be added to the solvent as the solvent passes through the cartridge.

Further objects and advantages of the present invention will be apparent from the following description, reference being had to the accompanying drawings wherein a preferred embodiment of the present invention is clearly shown.

Figure 1:
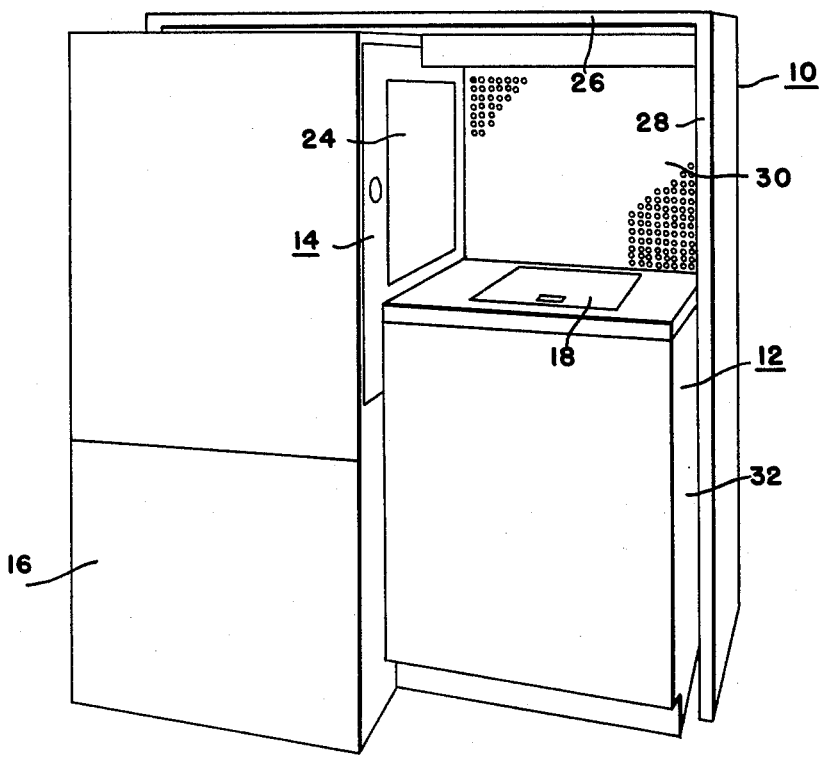
FIGURE 1 is a perspective front view of a self-service dry cleaning system provided with the filter cartridge of this invention.

In accordance with this invention and with reference to FIGURE 1, a self-service dry cleaning system is pictorially illustrated. The system includes an outer cabinet 10 for partially enclosing a clothes cleaner or agitating apparatus 12 and a clothes dryer or drying apparatus 14. Note that the clothes dryer 14 is elevated above the floor to provide for a filter compartment cabinet 16 therebelow. The clothes washer 12 has a top access door 18 which is pivotally openable for inserting and removing fabrics from the cleaner.

Clothes dryer 14 has a front access opening 24 which faces the cleaner access opening 18 adjacent one side thereof. This arrangement places the access doors 18 and 24 in a confined area defined by top wall 26 and a side wall 28 of the dry cleaner 10—a perforate grill 30 at the rear of the confined space operating to withdraw fumes from the area whenever either access door is opened. The outlet or vent grill 30 is connected through a venting system at the rear of the cabinet to the atmosphere.

Figure 2:
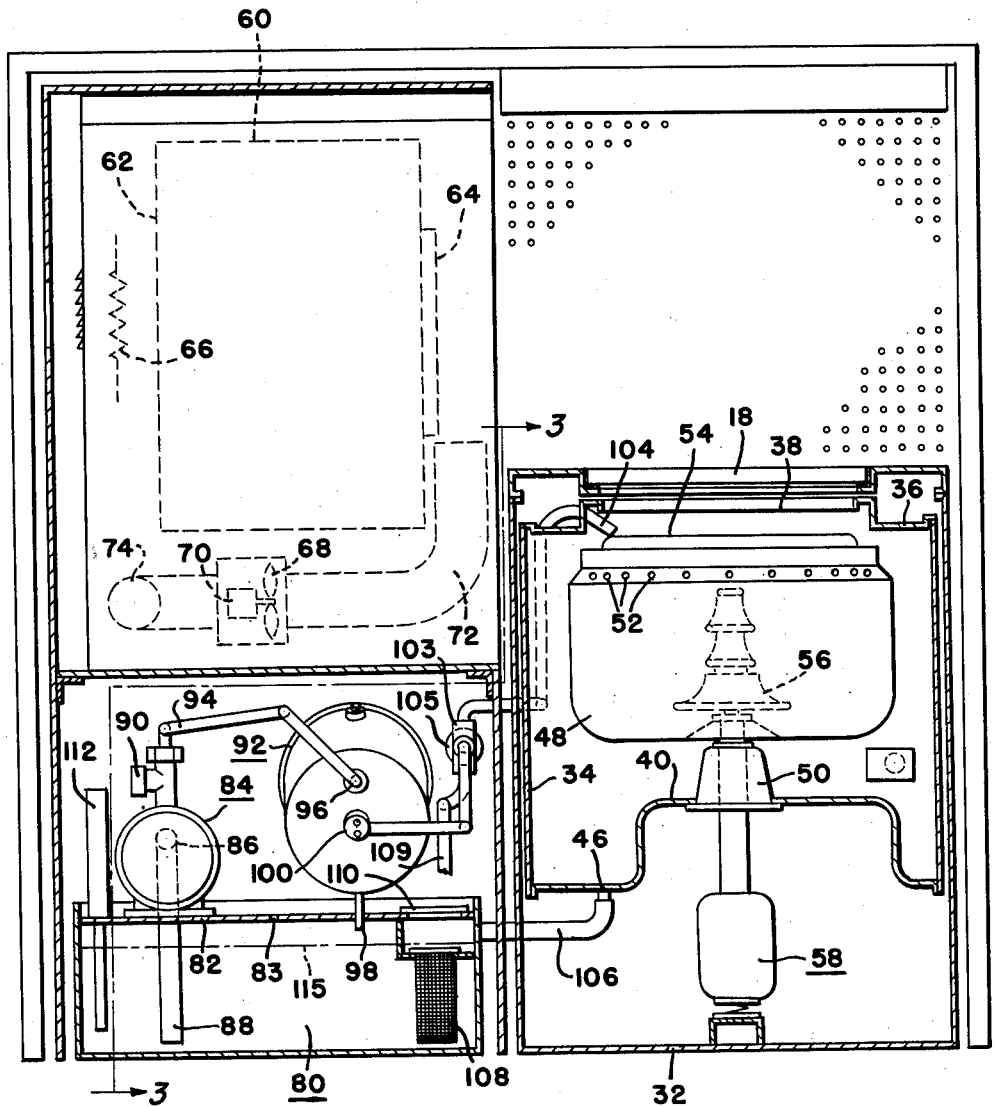
FIGURE 2 is a transverse sectional view of the dry cleaning apparatus.

Turning now to FIGURE 2, the cleaner or agitating apparatus 12 is shown comprised of an outer cabinet 32 in the top wall of which is located the access door 18 hinged along a rear edge thereof. Within the cleaner cabinet 32, a generally cylindrical imperforate solvent container 34 is disposed which includes a sub-top portion 36 having an access opening 38 in axial alignment with the top access lid 18 of the cleaner. A bulkhead 40 closes the lower end of the solvent container 34 and includes a drain opening 46 in the lowermost portion thereof. A generally cylindrical spin tub 48 is rotatably supported by a resilient inverted cuplike member 50 on the bulkhead 40 and includes a plurality of circumferentially arranged outflow ports 52 around an upper portion thereof. The tub 48 has a top access opening 54 which aligns with the openings 18 and 38 immediately above. Within the spin tub 48, an agitator 56 is adopted for vertical reciprocation. A motor-driven agitating and spinning mechanism is shown generally at 58 and is adapted to vertically reciprocate the agitator 56 when operated in one manner and to rotate or spin the tub 48 when rotated in another manner.

The clothes dryer 14 is a single pass, circulating air dryer substantially like that taught in the patent to Whyte, 2,843,945, issued July 22, 1958. The dryer includes a horizontally rotatable tumbling drum 60 having a perforate rear wall 62 and a front access opening 64 in alignment with the dryer door 24. A drying heater 66 is disposed adjacent the perforate rear wall 62 of the tumbling drum and adapted to be energized for drying clothes within the tumbling drum. During operation of the heater 66 and rotation of the tumbling drum 60, air is circulated by a fan shown generally at 68 driven by a motor 70 which may also be connected through a conventional pulley system for rotating the tumbling drum 60. The fan 68 is connected with the access opening 64 by way of a front duct 72, said front duct being exhausted by the fan through an exhaust duct 74 connected behind the dry cleaning cabinet to the outside vent system.

Figure 3:
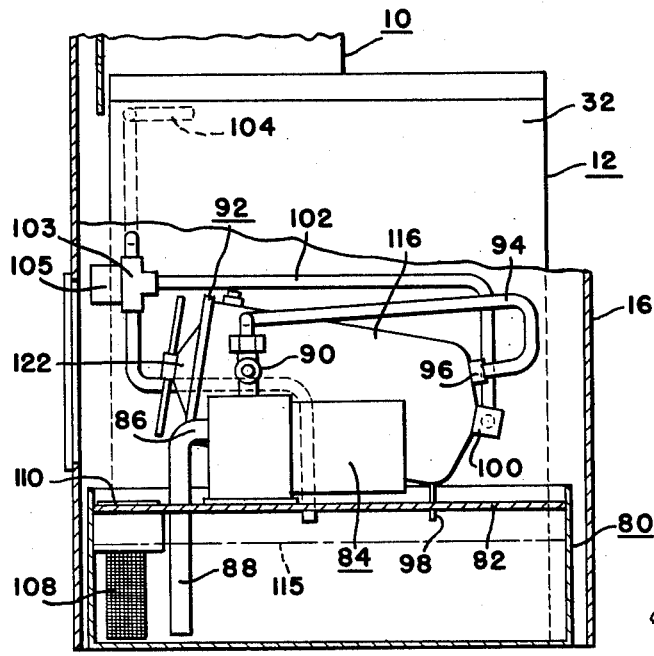
FIGURE 3 is a fragmentary sectional view, partly in elevation, taken along line 3—3 in FIGURE 2 to show the filter arrangement of this invention.

The circulating system for a dry cleaning fluid or solvent, such as perchloroethylene will now be described with reference to FIGURES 2, 3 and 4. The main components of the circulating system include a sump 80 having a top wall 82 with an air vent and spill-over return 83. Resting on the sump top wall 82 is a pump 84 which has its inlet 86 connected through a dip tube 88 to the bottom of the sump 80. A pressure valve 90 on the outlet side of the pump 84 indicates pressures in the system.

A filter assembly 92 is adapted to receive the output of the pump through a sloped conduit 94 which connects to the container inlet 96 of the assembly. Filter assembly 92 is positioned angularly in the filter compartment 16 such that a restricted air bleed and gravity drain 98 extending through the sump wall 82 will substantially drain the filter assembly of solvent when the dry cleaning system is shut down. At one end of the filter assembly, an outlet fitting 100 connects by way of a conduit 102 through a three-way valve 103 to the tub access opening 54—a terminal portion 104 of the conduit 102 overlying the top of the spin tub 48. The three-way valve 103 may be controlled by a solenoid 105 into a first position connecting the filter outlet 100 to the spin tub 48 and a second position connecting the filter outlet 100 to a sump return line 109. Completing the circulating system is a conduit 106 which connects to the drain outlet 46 of the solvent container 34. This conduit 106 enters the sump 80 by way of a button trap 108, access to which is gained through a removable lid 110 for cleaning this trap device as well as for adding additional solvent to the system. A sight glass 112 or other suitable means may be used for providing a visual indication of the cleaning fluid level 115 in the sump 80.

The fluid circulation system operates as follows. Pump 84 draws dry cleaning fluid or solvent from the sump 80 through the dip tube 88. This dry cleaning fluid, cleaned of large objects by the trap 108, is forced through the conduit 94 to the filter assembly 92. The filter, which will be described more fully next following, is effective as a complete solvent conditioning agent to filter small solids and to absorb solubles from the dry cleaning fluid as well as to add or dispense dry cleaning agents such as detergent or antistats to the solvent. The valve 103 is actuated so that the conditioned and supplemented solvent is then discharged from the filter assembly by way of the conduits 102 and 104 to the spin tub 48. When the level of dry cleaning solvent within the tub reaches the outflow ports 52, the solvent will overflow into the solvent container 34 and will return by gravity through the conduit 106 to the sump 80—the button trap 108 interceptiong its flow to remove large objects from the fluid.

Figure 4:
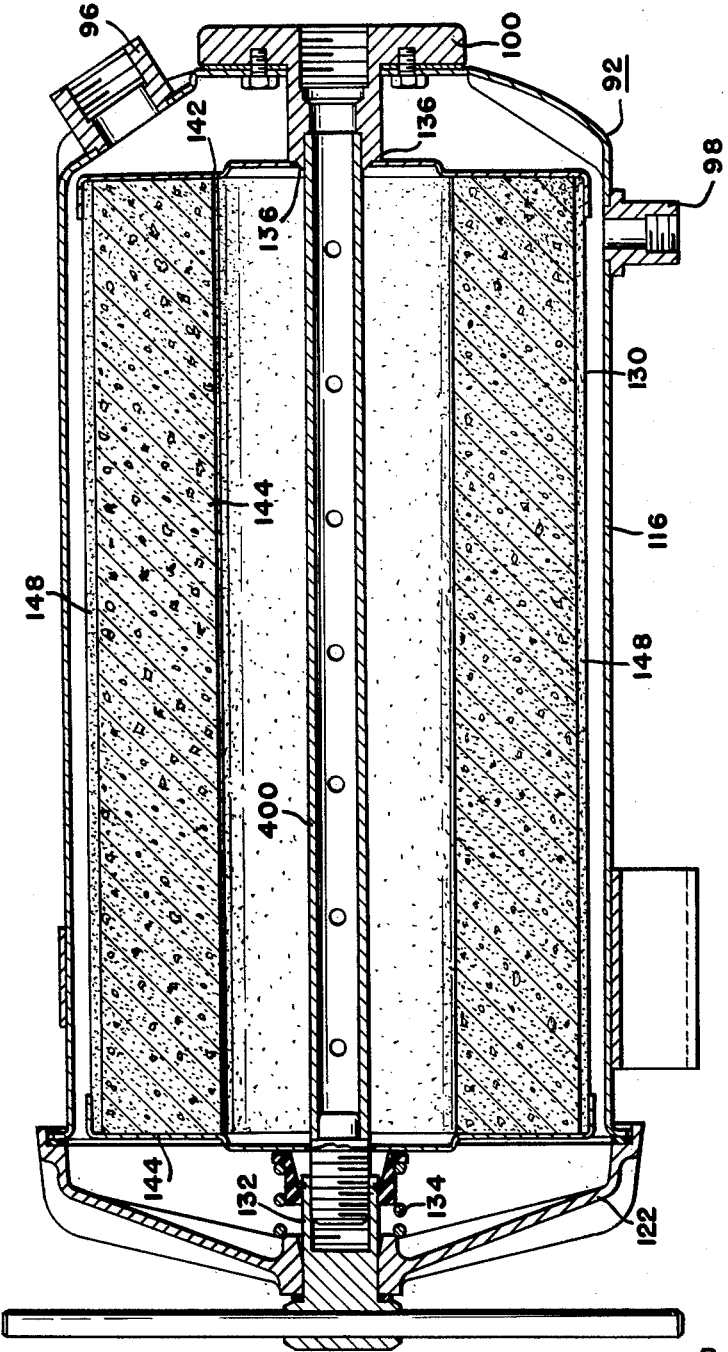
FIGURE 4 is a sectional view of the filter assembly including the filter casing and the filter cartridge.
Figure 5:
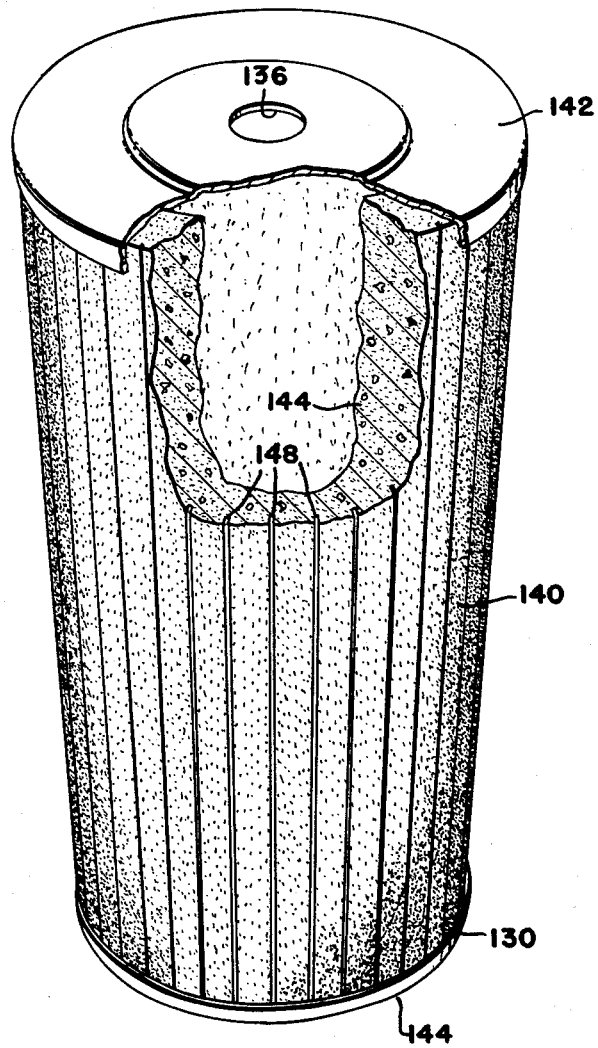
FIGURE 5 is a perspective view of the cast filter cartridge of this invention with parts broken away.

The construction of the filter assembly 92 is best seen in FIGURE 4 and includes a filter casing or container 116 containing a removable throw-away filter element, insert or cartridge shown generally as 130. This throw-away element 130 is retained in the filter casing 116 by the removable door or cover 122 which is latched to the casing through an adjustable shaft 132 threadedly connected with the outlet fitting 100 at the closed end of the filter casing by means of a perforated center conduit 400 which extends lengthwise in the casing to receive the filter cartridge. A spring fitting 134 serves to maintain a constant bias on the cartridge 130 to provide an effective seal at its juncture 136 with the outlet fitting 100 of the filter casing.

A complete dry cleaning system requires that the filter cartridge not only physically filter particulate matter from the solvent circulating therethrough, but that the cartridge actually treat or condition the solvent by neutralizing the acid, decolorizing or removing the dye content of the solvent, dispensing detergent or other cleaning additives such as antistat to the solvent and lastly controlling the moisture or water content of the solvent. The cartridge of this invention includes ingredients in a unitary disposable precast structure which are capable of performing each of the foregoing functions. The casting serves to fix in place all of the various components or ingredients as by cementing and/or casting. In other words, the fixed relationship of the components prevents their release in the form of granules or particles which could migrate to the spin tub 48 in the cleaner. A further advantage of the cast cartridge is that its exterior surface can be formed irregularly to increase the surface area exposable for physical filtration. This, in effect, gives a cartridge unit which is both a surface and a depth filter—the thickness of the casting serving as the depth filtering means. Another advantage of the cast device is that the various ingredients included can be varied easily without concern for the support structure, i.e. the filtering agents are uniformly dispersed throughout the matrix. The economy of such a filter cartridge 130 over the metal canister type is inherent since metal fabricating operations are mainly avoided.

In general the cartridge 130 is formed of a cast element 140 and a pair of matched end plates 142 and 144 which are cemented to the cast element 140 and retain the element in sandwiched relationship and channel solvent flow from the radially outer surface of the cartridge to its inside surface 144 from which point it flows through the perforated tube 400 to the outlet connection or fitting 100. Note that the cast element 140 is fluted or striated at 148 to increase the exterior surface area of the cartridge.

In general the method of forming the cast element 140 includes the following steps. First a dry mixture of fiber or felt of wool, cotton, rayon, cellulose or synthetic fibers is provided. To this is added the decolorizing activated charcoals, either powdered or pellet, a coarse powder being preferable. Next added is an acid neutralizing reagent such as the oxides or silicates of magnesium or calcium, powdered or pellet and preferably powdered. For binding the various dry mixtures together either an inorganic binder or an organic binder may be used. If the inorganic binder is used, a setting type such as plaster of Paris, Portland cement or magnesium oxychloride cement is suitable. If an organic binder is used, it is desirable to use a resin-type in a thermally sintering process. Other organic binders such as methyl cellulose, ethyl cellulose or polyvinyl alcohol may be used in a glue drying process. In selecting a binder, it is desirable to join the filter agents without coating them. In other words, any binder which will be insoluble in the dry cleaning solvent and which will leave the various agents free to perform their respective solvent treating functions will be suitable for the purposes of this invention.

Lastly, it is necessary to set the mixture in the form of the cartridge or casting 140. Water, if required, is added until the slurry is at the desired consistency and the mixture poured into a mold. With a heat setting type, the dry mixture is compacted and heated at the sintering temperature of the binder. Either process for setting the mixture is suitable within the purview of this invention.

One of the concepts of this invention is the utilization of a detergent in the cartridge mixture as a frothing agent for controlling and effecting the porosity of the cast cartridge 140. By using the detergent to froth the fiber or felt, the decolorizing activated charcoals and the acid neutralizing reagents, the final cast product is a combination physical filter, solvent purifier and conditioner, wherein the ingredients are fixed in situ and the casting is self-supporting.

In accordance with the foregoing method, the filter composite is thus made up of porous mineral or inorganic matrices such as plaster of Paris, magnesium oxychloride or Portland cements to contain the active sorbents such as charcoal, silica gel or alumina gel. Included in the matrices also is the neutralizer such as magnesium oxide, magnesium silicate, calcium oxide or calcium silicate and lastly the necessary dry cleaning detergents, such as the sodium, potassium or isopropylamine salts of organic phosphate ester types; nonyl phenol ethylene oxide types; salts of alkyl benzene sulfonic acid types; fatty acid polyglycol types; fatty acid alkanolamines; and alkyl aryl ethers of polyethylene glycol. Generally, the commercially available dry cleaning detergents are compounded of more than one type. The matrix is made porous through the addition of dry cleaner detergents and/or film-forming aids such as ethyl cellulose or polyvinyl alcohol. The fluid matrix is beat while compressed air is bubbled through the mixture just prior to casting, the bubbling and beating causing the detergent and air mixture to foam or froth throughout the matrix. By using this method, the casting is made not only a high-surface (the more bubbles or voids, the greater the surface) surface and depth filter but a total dry cleaning solvent treater or conditioner.

An added feature of this invention is the provision of an additional property built right into the matrix for controlling the water content of the dry cleaning solvent. A water carrying characteristic is found in the charcoal, the oxide and silicate neutralizers as well as in the inorganic matrix itself. But particularly the detergent is effective in carrying residual quantities of water which can be accurately controlled by the degree of drying to which the cartridge is subjected after casting and setting. To increase the water content in special instances, either more detergent plus water can be added or other water holding agents such as calcium chloride or similar desiccants can be added to the mixture before casting.

It should now be seen that an improved disposable filter cartridge has been provided wherein precasting eliminates the need for sheet metal support structures and effects a homogeneous cartridge element which completely treats the dry cleaning solvent in the following ways: physical filtering acid neutralization, decolorization, detergent or antistat addition and moisture control. Thus, there is created a disposable filter cartridge element which treats the solvent flowing through the cartridge and dispenses to the solvent ingredients usable in the spin tub for treating the fabrics being cleaned.

While the embodiment of the present invention as herein disclosed constitutes a preferred form, it is to be understood that other forms might be adopted.

What is claimed is as follows:

1. A filter for removing particulate matter and treating a dry cleaning solvent comprising a filter container having a container inlet adapted to receive solvent returning from a dry cleaning apparatus and a container outlet adapted to supply said dry cleaning apparatus with filtered and treated solvent, said container having an opening and a cover for closing said opening, and a filter cartridge insertible through said opening, said cartridge including a first plate having a filter cartridge outlet port in communication with said container outlet, a second plate effectively imperforate and in spaced parallel relationship to said first plate and a longitudinally extending cylindrical composite casting interposed in sandwiched relationship between said plates, said composite casting having a radially inner surface in communication with said container outlet through said filter cartridge outlet port and a striated radially outer surface extending substantially to the periphery of said plates and in communication with said container inlet, said composite casting comprising an integral filtering matrix of a porous inorganic material taken from the group consisting of plaster of Paris, magnesium oxychloride and Portland cement for removing particulate matter from said solvent and solvent conditioning means including an active sorbent dispersed uniformly throughout said matrix and retained thereby and taken from the group consisting of charcoal, silica gel and alumina gel for removing dissolved contaminate from said solvent, a neutralizer dispersed uniformly throughout said matrix and retained thereby and taken from the group consisting of magnesium oxide, magnesium silicate, calcium oxide, calcium silicate and barium oxide for neutralizing acid in said solvent, and a detergent frothingly dispersed throughout said matrix for controlling the porosity of said matrix and dispensible from said composite casting into said solvent throughout the life of said filter cartridge.

2. A filter for removing particulate matter and treating a dry cleaning solvent comprising a filter container having a container inlet adapted to receive solvent returning from a dry cleaning apparatus and a container outlet adapted to supply said dry cleaning apparatus with filtered and treated solvent, said container having an opening and a cover for closing said opening, and a filter cartridge insertible through said opening, said cartridge including a first plate having a filter cartridge outlet port in communication with said container outlet, a second plate effectively imperforate and in spaced parallel relationship to said first plate and a longitudinally extending tubular composite casting interposed in sandwiched relationship between said plates, said composite casting having an inner surface in communication with said container outlet through said filter cartridge outlet port and an outer surface in communication with said container inlet, said composite casting comprising an integral filtering matrix of a porous inorganic material for removing particulate matter from said solvent and solvent conditioning means including an active sorbent dispersed uniformly throughout said matrix and retained thereby for removing dissolved contaminate from said solvent, a neutralizer dispersed uniformly throughout said matrix and retained thereby for neutralizing acid in said solvent, and a detergent frothingly dispersed throughout said matrix for controlling the porosity of said matrix and dispensible from said composite casting into said solvent throughout the life of said filter cartridge.

3. A filter for removing particulate matter and treating a dry cleaning solvent comprising a filter container having a container inlet adapted to receive solvent returning from a dry cleaning apparatus and a container outlet adapted to supply said dry cleaning apparatus with filtered and treated solvent, said container having an opening and a cover for closing said opening, and a filter cartridge insertible through said opening, said cartridge including a first plate having a filter cartridge outlet port in communication with said container outlet, a second plate effectively imperforate and in spaced parallel relationship to said first plate and a longitudinally extending tubular composite casting interposed in sandwiched relationship between said plates, said composite casting having an inner surface in communication with said container outlet through said filter cartridge outlet port and an outer surface in communicaton with said container inlet, said composite casting comprising an integral filtering matrix of a porous inorganic material taken from the group consisting of plaster of Paris, magnesium oxychloride and Portland cement for removing particulate matter from said solvent and solvent conditioning means including an active sorbent dispersed uniformly throughout said matrix and retained thereby and taken from the group consisting of charcoal, silica gel and alumina gel for removing dissolved contaminate from said solvent, and a frothed detergent dispersed throughout said matrix for controlling the porosity of said matrix and dispensible from said composite casting into said solvent throughout the life of said filter cartridge.

4. A filter for removing particulate matter and treating a dry cleaning solvent comprising a filter container having a container inlet adapted to receive solvent returning from a dry cleaning apparatus and a container outlet adapted to supply said dry cleaning apparatus with filtered and treated solvent, said container having an opening and a cover for closing said opening, and a filter cartridge insertible through said opening, said cartridge including a first plate having a filter cartridge outlet port in communication with said container outlet, a second plate effectively imperforate and in spaced parallel relationship to said first plate and a longitudinally extending tubular composite casting interposed in sandwiched relationship between said plates, said composite casting having an inner surface in communication with said container outlet through said filter cartridge outlet port and an outer surface in communication with said container inlet, said composite casting comprising an integral filtering matrix of a porous inorganic material taken from the group consisting of plaster of Paris, magnesium oxychloride and Portland cement for removing particulate matter from said solvent and solvent conditioning means including a frothed detergent dispersed throughout said matrix for controlling the porosity of said matrix and dispensible from said composite casting into said solvent throughout the life of said filter cartridge.

5. A filter for removing particulate matter and treating a dry cleaning solvent comprising a filter container having a container inlet adapted to receive solvent returning from a dry cleaning apparatus and a container outlet adapted to supply said dry cleaning apparatus with filtered and treated solvent, said container having an opening and a cover for closing said opening, and a filter cartridge insertible through said opening, said cartridge including a first plate having a filter cartridge outlet port in communication with said container outlet, a second plate effectively imperforate and in spaced parallel relationship to said first plate and a longitudinally extending tubular composite casting interposed in sandwiched relationship between said plates, said composite casting having an inner surface in communication with said container outlet through said filter cartridge outlet port and an outer surface in communication with said container inlet, said composite casting comprising an integral filtering matrix of a settable, porous inorganic material for removing particulate matter from said solvent and solvent conditioning means including a frothed detergent dispersed throughout said matrix for controlling the porosity of said matrix and dispensible from said composite casting into said solvent throughout the life of said filter cartridge.

6. A composite casting adapted for use as a disposable filter cartridge in a solvent dry cleaning system and comprising an integral filtering matrix of a porous inorganic material taken from the group consisting of plaster of Paris, magnesium oxychloride and Portland cement for removing particulate matter from said solvent and a solvent conditioning means including an active sorbent dispersed uniformly throughout said matrix and retained thereby and taken from the group consisting of charcoal, silica gel and alumina gel for removing dissolved contaminants from said solvent, a neutralizer dispersed uniformly throughout said matrix and retained thereby and taken from the group consisting of magnesium oxide, magnesium silicate, calcium oxide, calcium silicate and barium oxide for neutralizing acid in said solvent, and a frothed detergent dispersed throughout said matrix for controlling the porosity of said matrix and dispensible from said composite casting into said solvent throughout the life of said filter cartridge.

7. A composite casting adapted for use as a disposable filter cartridge in a solvent dry cleaning system and comprising an integral filtering matrix of a porous inorganic material for removing particulate matter from said solvent and a solvent conditioning means including an active sorbent dispersed uniformly throughout said matrix and retained thereby for removing dissolved contaminants from said solvent, a neutralizer dispersed uniformly throughout said matrix and retained thereby for neutralizing acid in said solvent, and means for controlling and effecting the porosity of said filtering matrix, said last named means including a frothed detergent frothingly dispersed throughout said matrix for controlling the porosity of said matrix and dispensible from said composite casting into said solvent throughout the life of said filter cartridge.

8. A composite casting adapted for use as a disposable filter cartridge in a solvent dry cleaning system and comprising an integral filtering matrix of a settable mixture of fibers and porous inorganic material taken from the group consisting of plaster of Paris, magnesium oxychloride and Portland cement for removing particulate matter from said solvent and a solvent conditioning means including an active sorbent dispersed uniformly throughout said matrix and retained thereby and taken from the group consisting of charcoal, silica gel and alumina gel for removing dissolved contaminants from said solvent, a neutralizer dispersed uniformly throughout said matrix and retained thereby and taken from the group consisting of magnesium oxide, magnesium silicate, calcium oxide, calcium silicate and barium oxide for neutralizing acid in said solvent, and means for controlling and effecting the porosity of said filtering matrix, said last named means including a frothed detergent frothingly dispersed throughout said matrix for controlling the porosity of said matrix and dispensible from said composite casting into said solvent throughout the life of said filter cartridge.

9. A composite casting adapted for use as a disposable filter cartridge in a solvent dry cleaning system and comprising an integral filtering matrix of a settable porous inorganic material for removing particulate matter from said solvent and means for controlling and effecting the porosity of said filtering matrix, said last named means including a solvent conditioning means comprising a frothed mixture of detergent and air frothingly dispersed throughout said matrix for controlling the porosity of said matrix and dispensible from said composite casting into said solvent throughout the life of said filter cartridge.

References Cited in the file of this patent

UNITED STATES PATENTS

| | | |
|---|---|---|
| 369,718 | Hyatt | Sept. 13, 1887 |
| 771,971 | Davidson | Oct. 11, 1904 |
| 1,517,165 | Powell | Nov. 25, 1924 |
| 2,101,014 | Angelus et al. | Nov. 30, 1937 |
| 2,302,552 | Johnson | Nov. 17, 1942 |
| 2,303,629 | Gelinas | Dec. 1, 1942 |
| 2,376,418 | Clark et al. | May 22, 1945 |
| 2,435,707 | Bray et al. | Feb. 10, 1948 |
| 2,746,608 | Briggs | May 22, 1956 |
| 2,758,719 | Line | Aug. 14, 1956 |
| 2,796,989 | Kovacs | June 25, 1957 |
| 2,909,284 | Watkins | Oct. 20, 1959 |
| 3,025,233 | Figert | Mar. 13, 1962 |